Feb. 26, 1963  R. W. MITTEN  3,078,505
CONTINUOUS WEATHER STRIP MACHINE
Filed Feb. 19, 1958  2 Sheets-Sheet 1
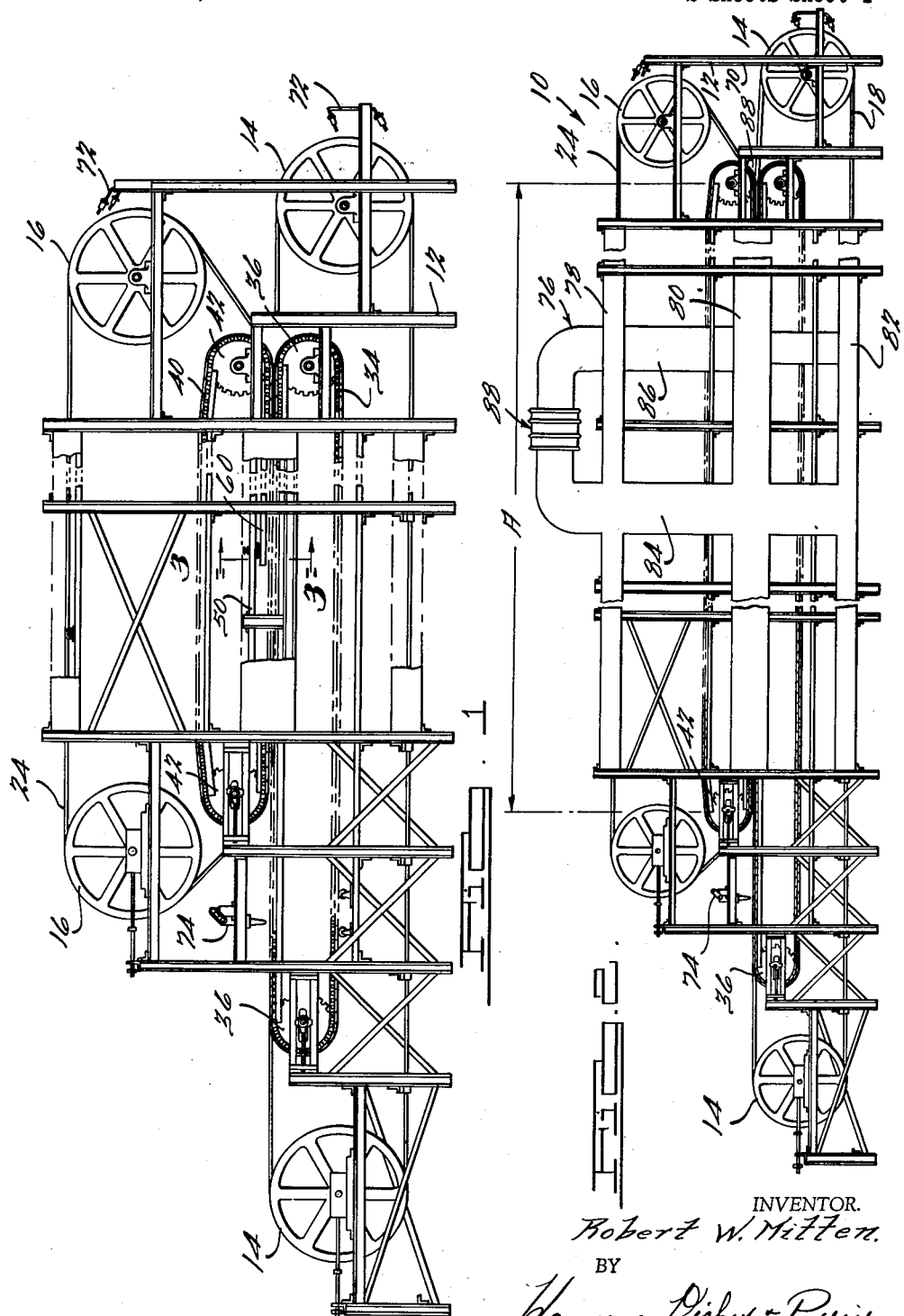
INVENTOR.
Robert W. Mitten.
BY
Harness, Dickey & Pierce
ATTORNEYS

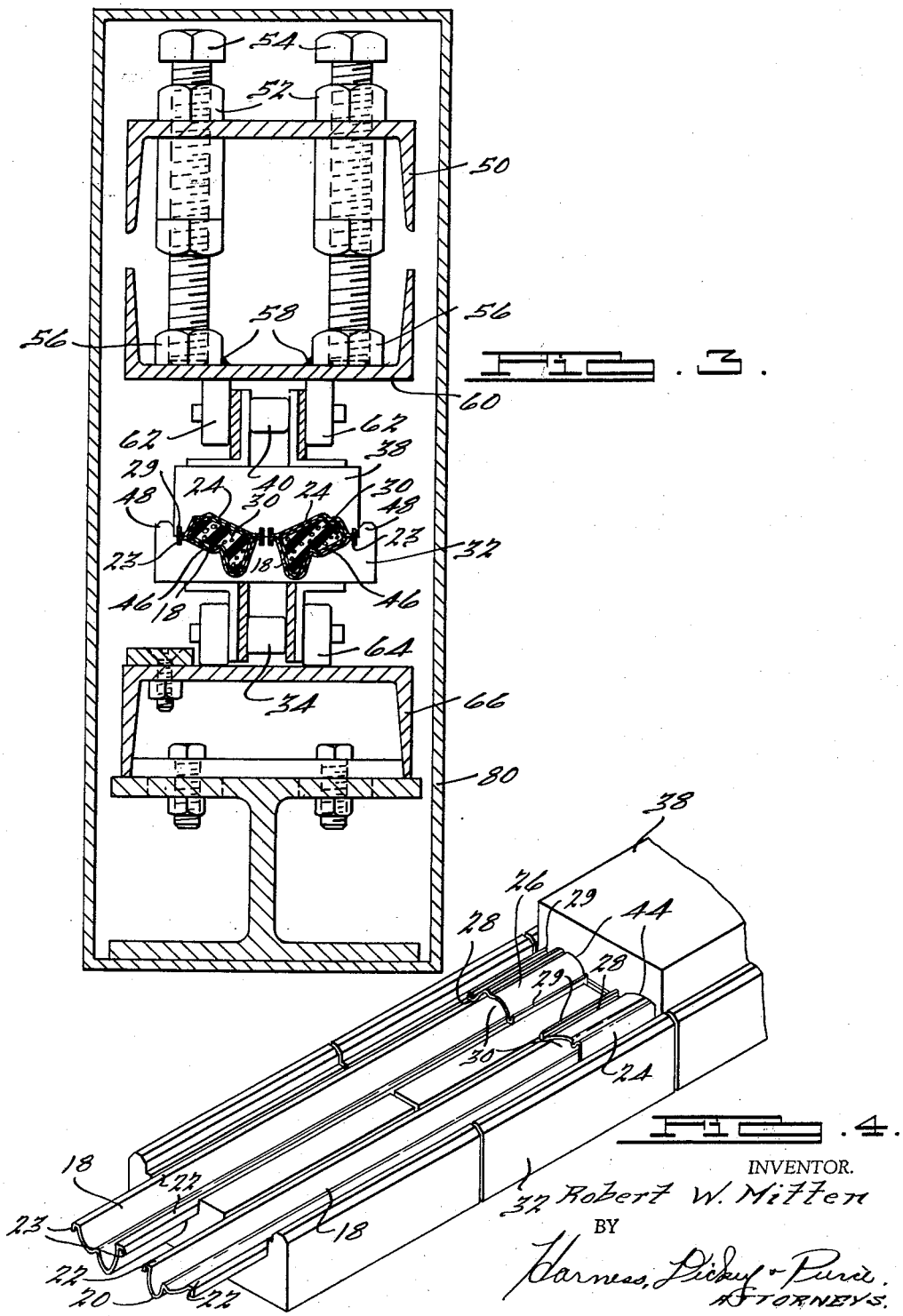

United States Patent Office 3,078,505
Patented Feb. 26, 1963

3,078,505
CONTINUOUS WEATHER STRIP MACHINE
Robert Wayne Mitten, Wabash, Ind., assignor to Sheller Manufacturing Corporation, a corporation of Indiana
Filed Feb. 19, 1958, Ser. No. 716,068
2 Claims. (Cl. 18—4)

This invention relates generally to molding apparatus and more particularly to apparatus for continuously molding articles of strip form. This application is a continuation-in-part of my prior application, Serial No. 612,724, filed September 28, 1956, now Patent No. 3,011,218.

In making weather-stripping of the type used for sealing automobile doors, refrigerator doors and the like, a continuous process is desired since such a process requires less manual attention and the length of the article formed is not limited. Many of the foam materials which might lend themselves to such a process are easily torn, crushed, and otherwise mutilated. Furthermore, the flexible polyurethane foams, which are particularly adaptable to such a system, have cells formed with thin walls which are subject to deterioration by moisture at extremes of temperatures. This invention provides an improved method and apparatus for forming continuous strip foam articles of the above type with a protective coating, generally of a rubber material, which is securely bonded to the foam strip.

An object of this invention, therefore, is to provide an improved apparatus for making continuous strip articles.

A further object of this invention is to provide apparatus for making continuous strip articles in which a skin coating material is bonded to the foam body of the article during manufacture.

A further object of this invention is to provide apparatus for forming continuous strip articles which includes a pair of endless mold belts arranged so that portions of the belts are adjacent each other and cooperate to form a mold cavity in which the strip article is formed.

Another object of this invention is to provide an improved apparatus for making continuous strip articles which is simple in construction, economical to operate, and efficient in operation in forming continuous strips of coated foam articles.

Further objects, features and advantages of this invention will become apparent from a consideration of the following description, the appended claims and the accompanying drawing in which:

FIG. 1 and 2 are side elevational views of the molding machine of this invention;

FIG. 3 is an enlarged transverse sectional view looking substantially along the line 3—3 in FIG. 2; and FIG. 4 is a perspective view of portions of the mold belts and the supporting blocks therefor in the machine of this invention.

With reference to the drawing, the molding machine of this invention, indicated generally at 10, is illustrated in FIG. 1 as including an elongated frame structure 12 having a lower portion which supports first horizontally aligned coplanar pairs of wheels or pulleys 14, only one pair of which is shown, and an upper portion which supports second horizontally aligned coplanar pairs of similar wheels or pulleys 16 and also only one pair of which is shown since the other pair is directly behind the pair shown in FIGS. 1 and 2. Each pair of horizontally aligned coplanar pulleys 16 is arranged in the vertical plane in which a corresponding pair of the pulleys 14 are located.

An endless mold belt 18 is trained about each coplanar pair of pulleys 14 and is formed of any flexible material such as polyethylene, butyl rubber, an appropriate silicon resin or rubber, or the like which can be made in belt form of the shape illustrated in FIGS. 3 and 4 and which will retain its shape at temperatures of about one hundred and fifty degrees Fahrenheit. The belt 18 is of a shape in transverse section such that when it travels along the straight portion of its path extending between the top sides of its supporting pulleys 14, it has an upwardly facing irregularly shaped lower wall portion 20 having horizontal flanges 22 which terminate in downwardly projecting extensions 23 arranged on opposite sides of the belt cavity. The extensions 23 act to prevent twisting of the belt 18 during travel between the pulleys 14.

A similar belt 24 is trained about each coplanar pair of upper pulleys 16 and is of a shape in transverse section such that during travel along the horizontal portion of its path between the lower sides of the upper pulleys 16 it has a downwardly facing irregularly shaped wall 26 having opposite side flanges 28 adapted to engage the corresponding flanges 22 on a lower belt 18. The flanges 28 on the upper belt 24 terminate in upright extensions 29 that stabilize the upper belt against twisting. As best appears in FIG. 4, each of the belts 18 mates with a corresponding coplanar belt 24 during travel of the belts along the straight line horizontal path indicated at A in FIG. 2, so as to form a mold cavity 30 between each pair of mated belts 18 and 24.

For maintaining a pair of belts 18 and 24 in a mating relation to form a mold cavity 30 therebetween, a series of belt supporting blocks 32 are arranged in an end-to-end relation and mounted on an endless chain 34 which extends about a pair of coplanar horizontally spaced sprockets 36 arranged between the pulleys 14. A second line of blocks 38 is mounted on an endless chain 40 trained about a pair of sprockets 42 arranged above the sprockets 36 as shown in FIGS. 1 and 2.

Each of the upper blocks 38 has longitudinally extending parallel cavities 44 formed in one side thereof, with each cavity 44 corresponding in shape to the shape of a belt 24. Each lower block 32 has similar cavities 46 arranged side by side and corresponding to the shape of the belts 18. The lower blocks 32 are wider than the upper blocks 38 and have upwardly extending flanges 48 spaced so that an upper block 38 can fit therebetween to insure a mating fit of corresponding upper and lower blocks.

The belts 18 and 24 have a tendency to stretch during use. Any stretching of course necks down or narrows a belt so as to reduce the distance between the flange extensions 23 or 29 to provide for a firm engagement of the extensions with the block 32 or 38, respectively, to prevent belt twisting with the consequent danger of separation of mating flanges 22 and 28 with a resulting leakage of foam from a cavity 30.

The frame 12 has horizontal channel members 50, spaced portions of which carry nuts 52 in which downwardly extending bolts 54 are supported. At their lower ends, the bolts 54 are threaded into nuts 56 secured by welding 58 to an upwardly facing channel member 60. Only one channel member 60 is illustrated in the drawing but it is to be understood that there are several of such channel members arranged above the upper blocks 38 during travel along the path A.

Rollers 62 on the chain 40 for the upper blocks 38 travel on the under side of each channel member 60 so that the vertical position of the channels 60 in effect determine the position of the horizontal line along which the blocks 38 travel. The lower chain 34 carries rollers 64 which ride on a stationary frame member 66 so that the line along which the lower blocks 32 travel is fixed. By adjusting the bolts 54, the distance between the roller supporting frame members 60 and 66 is readily adjusted to maintain mating blocks 32 and 38 in positions in which the belt flanges 22 and 28 are in tight engagement with each other.

It can thus be seen that a belt 18 and its corresponding mating belt 24 continuously travel in clockwise and counterclockwise directions, respectively, as viewed in FIGS. 1 and 2, so that during travel of the belts along the straight path A, they are in mating engagement so as to define a mold cavity 30 therebetween. The belts are of a shape in transverse section such that the mold cavities 30 formed therebetween are of a shape corresponding to the desired final shape of the continuous strip article. An irregular shape for weatherstripping is illustrated in the drawing. By virtue of this arrangement of a pair of belts 18 and 24, portions of the belts are continuously in mating engagement so that an elongated mold cavity is continuously formed along the path A.

Mounted on the right hand end 70 of the frame 12, as viewed in FIGS. 1 and 2, are automatic spray gun assemblies 72 which are arranged "down-stream" relative to the path A, with a gun assembly 72 being provided for each pair of belts 18 and another assembly for each pair of belts 24. A two-component mixing head 74, of well known construction and which by itself forms no part of the present invention, is mounted on the frame 12 at a location adjacent the up-stream end of path A and is fed by controlled metering pumps. The head 74 mixes and deposits the reaction mass, which when cured forms the foam body of the strip article, on the belts 18. In one form of the invention the head 74 deposits a blended urethane on the belts 18.

A heating duct assembly 76 for the machine 10 includes a horizontal duct member 78, which surrounds portions of the upper belts 24, during the horizontal travel thereof between the top sides of the pulleys 16. A second horizontal duct member 80 surrounds the belts 18 and 24 and the blocks 32 and 38 during the major portion of the travel thereof along the path A and a third duct member 82 surrounds portions of the belts 18 during travel thereof between the lower sides of the pulleys 14. The horizontal duct members 78, 80 and 82 are connected by upright hot air delivery and return ducts 84 and 86, respectively, which communicate at their upper ends with a heating assembly 88 consisting of steam coils and a fan (not shown).

In the operation of the machine 10, the pulleys 14 and 16 are rotated so that the belts 18 and 24 travel at the same rate of speed through the heating duct 80. This speed, the length of the duct 80, and the temperature in the duct, are adjusted to provide the desired curing of the reaction mass in the cavities 30 during travel of the mass through the duct 80. In one embodiment of the invention, the belts travel at a rate of from four to sixteen feet per minute, the temperature of the gases in the duct 80 are maintained at about one hundred and forty degrees Fahrenheit and the duct 80 is about forty feet long.

The gun assemblies 72 are operated to deposit a coating of neoprene, or other suitable skin material which can be set by heating, on the upper and lower belts 18 and 24. This coating is preferably of a thickness of between .005 and .010 inch. The coating material may be initially in the form of a latex dispersion, either an aqueous or non-aqueous type, in a suitable solvent. Examples of suitable rubbery skin materials are neoprene, rubber, either synthetic or natural, rubber cement, both natural and synthetic, rubber latex, both natural and synthetic, e.g., neoprene latex or synthetic resins of thermoplastic type.

The coated belts then travel through the ducts 78 and 82 so that the neoprene coating thereon is partially cured and is in a tacky condition as it approaches the mixing head 74. The mixing head 74 operates, in one form of the invention, to deposit a continuous stream of a polyurethane, or diisocyanate foam material, as it is sometimes described, on the lower belts 18 in amounts such that each lower belt cavity is only partially filled with the reaction mass. Because the reaction mass is applied to the coating material while it is in a tacky condition, adhesive materials or cements are not necessary for securing the subsequent foam material to the coating since a bonding, of a chemical type, of the skin coating to the cellular reaction product is brought about by the polymerization of the reactants which form the final product.

Each lower belt 18 with the coating material thereon and carrying a small amount of the reaction mass deposited by the mixing head 74, advances into mating relationship with a similarly coated belt 24 so as to enclose the mass within the mold cavity 30 as the belts advance into the heating duct 80. As the curing of the mass proceeds in the duct 80, it foams out until it completely occupies the mold cavity 30 and forms a cellular mass therein. The amount of set-up or cure allowed to take place for the reaction mass is determinative of the cell structure of the final product.

In accordance with the present invention, it thas been found that flexible diisocyanate cellular reaction products can be formed with a cell structure of two types, viz., open or closed. The articles produced with open or interconnecting cells have a greater recovery power when subjected to intermittent pressures because they "breathe" so to speak, i.e., they allow the gas or air entrapped in the individual cells to escape through the interconnecting cell structure upon the application of pressure and when the pressure is released, the surrounding atmosphere readily enters the foam product through the maze of interconnecting cells. The difference in cell structure of diisocyanate foam products can be effected in the practice of the invention by controlling the amount of ingredients placed in the mold cavity and regulating the state of cure to which the reaction products are allowed to proceed when in the mold cavity. The production of interconnecting or open cell type foam is of primary interest when the product is to be used for automotive weatherstripping or for sealing of refrigerator doors and allied applications. Production of diisocyanate foam products with closed cells in which the individual cells do not communicate with each other is useful for different applications.

The concurrent curing of the foam and coating materials provides for a chemical bonding thereof; consequently, when a pair of mating belts 18 and 24 separate at point 88, the strip article formed therebetween is readily removed since the belts 18 and 24 are formed of slick surface materials to which other materials will not readily stick. The final strip article consists of a foam body provided with a protective coating. If a further cure of the strip article is necessary, in order to provide the desired cell structure, it may be accomplished after the article has been separated from the belts 18 and 24.

The following examples of prepolymer, emulsifier-catalyst-water combinations are disclosed in my earlier application referred to above and are re-produced here for the purpose of illustrating the reaction materials which may be satisfactorily used in the process of this invention. The prepolymer component and the emulsifier, catalyst, water component, are added separately to the two component mixing head 74 which then applies the components to the belts 18 so that foaming first takes place on the belts 18.

Example 1

A prepolymer was formed by reacting a polyester resin and a diisocyanate each in the proportions as follows:

| | Parts by wt. |
|---|---|
| Polyester resin (U-148, a product of Rohm & Haas) | 70 |
| Diisocyanate (Hylene 80/20, a product of duPont) | 30 |

The diisocyanate was added to the polyester resin at room temperature and the mixture was allowed to exotherm for 1 hour. The temperature of the mixture was then gradually raised to 180° F. over a period of 1 hour and maintained at this temperature for 1 hour thereafter and then cooled rapidly to 75° F. The prepolymer was then reacted with an emulsifier, a catalyst and water in the following proportions:

| | Parts by wt. |
|---|---|
| Prepolymer | 100 |
| Emulsifier EL-719 (a product of Antara Products) | 1.25 |
| Catalyst (N-methyl morpholine) | 3 |
| Water | 2 |

Example 2

A prepolymer was prepared as in the previous example employing a polyester resin and a diisocyanate in the following proportions:

| | Parts by wt. |
|---|---|
| Polyester resin (Price 3000, a product of Price Resin Co.) | 75 |
| Diisocyanate (Hylene 65/35, a product of duPont) | 25 |

The prepolymer was reacted with an emulsifier, a catalyst and water in the following proportions:

| | Parts by wt. |
|---|---|
| Prepolymer | 100 |
| Emulsifier EL-719 (a product of Antara Products) | 1 |
| Catalyst (diethylanolamine) | 3 |
| Water | 1.5 |

Example 3

A polyester resin, a diisocyanate, a catalyst and water were simultaneously mixed in a mixing vessel in the following proportions:

| | Parts by wt. |
|---|---|
| Polyester resin (Price 3000, a product of Price Resin Co.) | 100 |
| Diisocyanate (Hylene 80/20, a product of duPont) | 40 |
| An emulsifier EL-719 (a product of Antara Products) | 1.5 |
| Catalyst (N-methyl morpholine) | 1 |
| Water | 3 |

Example 4

A prepolymer was formed by reacting a polyalkylene ether glycol resin with a diisocyanate in the following proportions:

| | Parts by wt. |
|---|---|
| Polyalkylene ether glycol (Terracol 30, a product of duPont) | 40 |
| Diisocyanate (Hylene 80/20, a product of duPont) | 10 |

All of the glycol resin was added to a mixing reactor and the temperature was raised to 120° F. Half of the above amount of the diisocyanate was then added to the glycol resin and the temperature of the mixture was raised to 180° F. and maintained at this temperature for approximately two hours. The remainder of the diisocyanate was then added and the temperature was raised to 280° F. and held at this temperature for an additional period of approximately two hours. The mixture was then cooled rapidly to 120° F. to form the prepolymer.

The prepolymer was then reacted with a catalyst, silicone oil and water in the following proportions:

| | Parts by weight |
|---|---|
| Prepolymer | 100.00 |
| Diisocyanate (Hylene TM, a product of du Pont) | 4.00 |
| Silicone oil (DC-200, a product of Dow Corning) | .01 |
| Catalyst (N-methyl Morpholine) | 1.25 |
| Water | 4.00 |
| Emulsifier (A-9, a product of Mobay Chemical Co.) | 0.5 |

It is to be understood, of course, that the reaction mass can be formed by the direct combination of an organic substance having a plurality of groups containing reactive hydrogen, a diisocyanate, a catalyst and water, as in Example 3, instead of using the two component mixing head 74 and a prepolymer.

Although the invention has been described with respect to a preferred embodiment thereof, it is to be understood that it is not to be so limited, since changes can be made therein which are within the scope of the invention as defined by the appended claims.

What is claimed is:

1. A continuous molding machine comprising a first resilient belt member mounted for movement along a first endless path having upper and lower substantially horizontal portions, first heating means associated with and extending along at least a portion of said lower horizontal portion of said first endless path, a second resilient belt member mounted for movement along a second endless path having upper and lower substantially horizontal portions arranged so that the lower portion of said second endless path is adjacent to and above the upper horizontal portion of said first path, second heating means associated with and extending along at least a portion of said upper horizontal portion of said second endless path, said belt members being of shapes in transverse section such that they cooperate during travel along the adjacent portions of their paths to enclose a mold cavity therebetween, third heating means associated with and extending along at least a portion of said adjacent portions of said first and said second endless paths, said first member defining the lower portion of said cavity and said second member defining the upper portion of said cavity, and means for supporting said belts during travel along said adjacent portions of their paths for preventing movement of said belts in directions away from each other, said means comprising supporting blocks having cavities therein of a shape corresponding to the external shape of said belts, said blocks being connected in lines corresponding to said belts and mounted for movement along endless paths having substanitally horizontal portions parallel to and adjacent the horizontal portions of said adjacent belt paths, means adjacent the downstream end of said first and said second members for spraying a coating material on the interior surface portion of said members and feed means located adjacent the upstream end of the upper path portion of said first member and spaced from the adjacent portion of the paths of said first and said second members for feeding foamable materials into the said lower portion of said cavity in said first member.

2. A continuous molding machine comprising a first resilient belt member mounted for movement along a first endless path having upper and lower substantially horizontal portions, first heating means associated with and extending along at least a portion of said lower horizontal portion of said first endless path, a second belt member mounted for movement along a second endless path having upper and lower substantially horizontal portions arranged so that the lower portion of said second endless path is adjacent to and above the upper horizontal portion of said first path, second heating means associated with and extending along at least a portion of said upper horizontal portion of said second endless path, said belt members being of irregular shapes in transverse sections so that they cooperate during travel along the adjacent portions of their paths to enclose a mold cavity therebetween, third heating means associated with and extending along at least a portion of said adjacent portions of said first and said second endless paths, means associated with said belt members for moving said belt members so that they move in the same direction as they travel along said adjacent portions of their respective paths, means adjacent the downstream ends of said portions for spraying a coating material on the inner surface portion of each of said belts, and means adjacent the upstream end of the path portion of said first member for depositing a reaction mass in said lower cavity portion of said first member.

References Cited in the file of this patent

UNITED STATES PATENTS

| | | |
|---|---|---|
| 1,440,715 | Bliss | Jan. 2, 1923 |
| 2,075,735 | Loomis | Mar. 30, 1937 |
| 2,315,366 | Daley et al. | Mar. 30, 1943 |
| 2,319,042 | De Wyk | May 11, 1943 |
| 2,394,327 | Niessen et al. | Feb. 5, 1946 |
| 2,602,960 | Fischbein | July 15, 1952 |
| 2,728,942 | Wallace | Jan. 3, 1956 |
| 2,753,642 | Sullivan | July 10, 1956 |
| 2,760,228 | Verges | Aug. 28, 1956 |
| 2,817,875 | Harris et al. | Dec. 31, 1957 |